Patented Sept. 20, 1949

2,482,586

UNITED STATES PATENT OFFICE 2,482,586

MINERAL AGGREGATE BONDING COMPOSITIONS

Arthur B. Hersberger, Drexel Hill, and Frank J. Gozlow, Philadelphia, Pa., assignors to The Atlantic Refining Co., Philadelphia, Pa., a corporation of Pennsylvania No Drawing. Application February 6, 1947, Serial No. 726,962

9 Claims. (Cl. 106—273)

This invention relates to improved mineral aggregate bonding compositions and more particularly to the preparation of improved road paving compositions.

The two methods generally used in the preparation of bituminous pavements are, one in which a layer of bituminous cut-back or emulsion is spread on a road, a layer of mineral aggregate such as crushed stone is spread upon it, and the mixture is compacted; and the other method is one in which mineral aggregate is first provided with a coating of bitumen by mixing the aggregate mechanically with a bitumen or bituminous cut-back or emulsion until an adhesive coating of the bitumen is formed on each piece of the aggregate, the coated aggregate then being laid on the road and compacted. Where aggregate is used that has first been dried and hot bitumen or bituminous cut-back applied to the aggregate, there is little difficulty experienced in securing a good bond between the bitumen and the aggregate, except with an acidic aggregate such as siliceous aggregates.

One of the objects of the present invention is to permit the coating of surfaces of damp or wet aggregates with a bituminous composition in such a manner that the coating obtained is satisfactory and produces a firmly bonded mass.

A further object of this invention is to prepare a paving mixture bonded with asphalt in which the asphalt coating, when applied to either dry or wet aggregate is not readily displaced or stripped when subjected to the action of water.

A still further object of this invention is to prepare a bitumen or bituminous mixture containing an anti-stripping or adhesive agent which is stable to heat over considerable periods, and which is particularly adapted for incorporation in bitumens, asphalts, and road oils which may be stored, transported, or applied at elevated temperatures.

The present invention relates to a method of improving the adhesivity of bitumen to not only alkaline stones, such as limestone, slag, and dolomite, but also to acidic or siliceous type of mineral aggregates. Not only dry, but also wet aggregates may be successfully coated by the products of the present invention, and the pavings thereby prepared will not disintegrate under the action of water. It will be understood that the invention is especially advantageous in its application to the coating of wet mineral aggregates with bitumen, bituminous cut-backs, and bituminous emulsions.

Since adhesiveness is a consequence of wetting power, it is important that the wetting power of the bituminous binders toward the mineral aggregate be as high as possible. In the presence of moisture or water, adhesiveness depends upon the respective wetting powers of water and the bituminous binder toward the mineral aggregate; if the wetting power of the water is higher than that of the binder, the former will displace the latter, and prevent the bituminous binder from adhering to the surface of the aggregate. It is, therefore, an object of this invention to improve the adhesivity of the bituminous material as hereinafter described.

In accordance with the present invention, it has been found that the wetting power of bitumens for all types of mineral aggregates is markedly improved by incorporating in the bitumen a relatively small quantity of a condensation product of a diamine with a compound from the group consisting of alkyl and alkenyl substituted succinic and succinamic acids, anhydrides, and acid esters thereof.

These condensation products, when added to bitumens in amounts of from 0.1% to 2.0% by weight, were found to be highly satisfactory in increasing the wetting power or adhesivity of the bitumens for aggregates. While larger quantities, for example, 5% to 10% of these products may be used, the improvement in adhesivity is not increased proportionately, and it appears to be uneconomical in most cases to use more than about 2% by weight of the products. Generally, from 0.5% to 2% will suffice, except under conditions in which the aggregate is exceptionally wet.

The condensation products of this invention are soluble in or compatible with bituminous materials such as petroleum asphalts or residuums, flux asphalts, coal tar pitches or residuums, cracking still tars or residues, as well as heavy naphthenic or aromatic oils, and the like. In accordance with the present invention, the products may be incorporated in various bituminous materials including asphalt, asphalt cut-back, asphalt emulsions, etc., in order to render the bitumen more adhesive or less liable to strip from mineral aggregates.

The condensation products utilized in accordance with the present invention may be prepared by various methods, of which the following are exemplary.

Olefin hydrocarbons containing from 5 to 20 carbon atoms produced by the dehydration of the corresponding alcohols, or by the removal of hydrogen halide from the corresponding hydrocarbon halides, or by the polymerization of lower olefins such as propylene, butylene, isobutylene, the amylenes, and the hexylenes or mixtures thereof, are caused to react with an unsaturated dicarboxylic acid or anhydride under the influence of heat to produce the alkenyl dicarboxylic acid or anhydride. Suitable charge materials include maleic anhydride or acid, fumaric acid, citraconic anhydride or acid, itaconic anhydride or acid, mesaconic acid, glutaconic anhydride or acid, methyl itaconic anhydride or acid, and the like. Alternatively, the alkyl dicarboxylic acid or anhydride may be prepared by hydrogenation of the corresponding $C_5$ to $C_{20}$ alkenyl dicarboxylic acid or anhydride, or by treating a dicarboxylic acid ester with an alkali metal alcoholate in alcohol to replace a hydrogen atom on the alpha carbon atom of the ester with an alkali metal atom, and then reacting this product with an alkyl halide to introduce the alkyl group and eliminate the alkali metal as alkali metal halide. The alkylated dicarboxylic ester may then be reduced to the acid or the anhydride. Another method for producing the $C_5$ to $C_{20}$ alkyl dicarboxylic acid or anhydride comprises treating an unsaturated dicarboxylic acid or anhydride with a hydrogen halide to obtain a halogenated, saturated dicarboxylic acid or anhydride, and then replacing the halogen atom on the alpha carbon atom with an alkyl group by treatment with an alkyl halide and a catalyst or an alkali metal.

The alkyl or alkenyl dicarboxylic acid or anhydride may then be reacted with a diamine or polyamine to obtain a condensation product suitable as an additive for bitumens. The diamines or polyamines may be employed in molar ratios ranging from 1 to 2, although higher ratios are not detrimental. Molar ratios of 1.3 to 2 have given very good results in the production of the condensation products. The amines which may be utilized in the condensation reaction are those containing from 2 to 18 carbon atoms, and may be exemplified by ethylene diamine, diethylene triamine, triethylene tetramine, 1-methyl ethylene diamine, 1-ethyl ethylene diamine, propylene diamine, butylene diamine, trimethyl trimethylene diamine, tetramethylene diamine, diaminopentane or pentamethylene diamine, diaminohexane, hexamethylene diamine, heptamethylene diamine, diamino-octane, decamethylene diamine, and the higher homologues up to 18 carbon atoms, phenylene diamine, the alkylated phenylene diamines having nuclear substituents such as methyl, ethyl, propyl, butyl, etc., naphthalene diamine, and the alkylated naphthalene diamines. The condensation reaction may be carried out by simply adding the diamine or polyamine to the alkyl or alkenyl dicarboxylic acid or anhydride at ordinary temperature (60° F. to 80° F.) and then stirring vigorously. As the condensation proceeds, the temperature of the reaction mixture rises to 150° F.–220° F., with the elimination of water produced by the condensation. The condensation products, when cooled to room temperature, range from viscous, yellowish liquids to solids. When the charge materials are themselves solids, the reaction may be initiated by the application of heat sufficient to render the reactants liquid and capable of being mixed and stirred.

In the preparation of the condensation product of a diamine with an amido carboxylic acid, the latter may first be formed by treating an alkyl or alkenyl dicarboxylic acid or anhydride with ammonia (for example, 28% aqueous ammonia) to form the ammonium salt of the amido carboxylic acid. This product, when acidified with a mineral acid, such as hydrochloric acid, yielded the amido carboxylic acid, which in turn, may be condensed with a diamine by stirring the mixture at ordinary temperature, heat being liberated as the condensation proceeds. The reaction temperature may rise to 120° F.–220° F., and upon cooling, the condensation products range from extremely viscous yellow-orange liquids to wax-like solids.

Condensation products also suitable for use in accordance with this invention may be prepared by reacting the acid esters of the alkyl and alkenyl dicarboxylic acids or the acid esters of the alkyl and alkenyl amide carboxylic acids with diamines or polyamines. The acid esters may be produced by reacting, for example, equimolar quantities of an alcohol with the acid or anhydride. The alcohols may be exemplified by methyl, ethyl, propyl, isopropyl, butyl, amyl, etc. The reactants may be heated to temperatures of the order of 300° F. and maintained at this temperature for 1 to 3 hours, and then distilled to recover the desired acid ester. Another method for preparing the acid esters consists in reacting, for example, equimolar quantities of the acid or anhydride and an alkali metal alcoholate by refluxing the mixture at an elevated temperature for 2 to 8 hours in the presence of a diluent such as benzene. After refluxing, the alkali may be removed by washing the product with mineral acid, and then separating the benzene by distillation, leaving the desired acid ester. To prepare the condensation product, equi-molar quantities, for example, of a diamine and the acid ester are mixed at ordinary temperature, and then vigorously stirred. As the condensation progresses, the temperature may rise to 120° F.–180° F., and after cooling, there is obtained a condensation product which may range from a viscous oil to a solid.

The present invention may be further illustrated by the following examples, which, however, are not to be construed as limiting the scope thereof:

1. Nonylene, dodecylene, and octadecylene were reacted, respectively, with maleic anhydride by heating at 400° F. in a closed system with no external pressure applied, for a period of 1 to 4 hours. Vacuum distillation of the reaction products yielded the respective nonenyl, dodecenyl, and octadecenyl succinic anhydrides, substantially free of unreacted mono-olefins and maleic anhydride. Using equimolar proportions of the mono-olefin and the maleic anhydride gave a 40% to 60% yield of the corresponding alkenyl succinic anhydrides, whereas using 4 moles of mono-olefin to 1 mole of maleic anhydride gave substantially 100% conversion into the corresponding alkenyl succinic anhydride.

The alkenyl succinic anhydrides as above prepared were condensed with ethylene diamine by slowly adding 2 moles of the diamine to the respective anhydrides at room temperature with vigorous stirring. Reaction immediately occurred and the temperature of the reaction mixture rose to 150° F.–220° F., with the elimination of by-product water. Upon cooling to room temperature (70° F.) the condensation products were extremely viscous yellow liquids, soluble in water and in hydrocarbon solvents employed in preparing cut-back asphalts or road oils.

2. To 1 mole of each of the nonenyl, dodecenyl, and octadecenyl succinic anhydrides was added 4 moles of ammonia (28% $NH_3$ in water solution) with vigorous stirring and cooling with ice water.

Heat was liberated and viscous solutions of the corresponding ammonium alkenyl succinamates in excess ammonia were obtained. Each of the solutions was diluted with water and cooled to 32° F., and a 20% concentration hydrochloric acid solution was slowly added with stirring until two phases appeared, and the lower or aqueous phase was acidic to methyl orange indicator. The upper phase was a viscous yellow oil which was separated from the acid aqueous phase, and which constituted the alkenyl succinamic acid.

An alternative method for the preparation of the alkenyl succinamic acids comprised heating 1 mole of the alkenyl succinic anhydride to 350° F.–400° F. and maintaining the anhydride at this temperature while passing gaseous ammonia through the anhydride. After 2 to 3 moles of ammonia had been added, the product was quickly cooled and the alkenyl succinimide, which was a liquid, was obtained. 1 mole of sodium hydroxide in water solution was added to the succinimide with stirring to give a water solution of the sodium salt of the alkenyl succinamic acid. Acidification of the sodium salt solution liberated the alkenyl succinamic acid as a viscous yellow oil.

The condensation of the alkenyl succinamic acid with ethylene diamine was effected by slowly adding 1 mole of the diamine to 1 mole of the alkenyl succinamic acid with vigorous stirring at room temperature. During the ensuing reaction, the temperature rose to 120° F.–220° F., and upon cooling, there was obtained a viscous yellow liquid, almost wax-like, which was water soluble and soluble in hydrocarbon solvents (aromatic naphtha, kerosine, or tar distillate), as well as in asphalt.

3. The condensation of the alkenyl succinic acid esters with ethylene diamine was accomplished by mixing equimolar proportions of the acid ester and the diamine at room temperature with vigorous stirring. Due to the reaction, a temperature rise to 120° F.–180° F. was observed, and the resulting condensation product, upon cooling, was an extremely viscous oil which was soluble in water and aromatic hydrocarbon solvents. The acid esters used in this condensation reaction may be prepared by the reaction of equimolar proportions of alcohol, for example, methyl or ethyl, with the alkenyl succinic anhydride. The reactants are heated to 300° F. and maintained at this temperature for 1 to 3 hours, and then distilled to recover the alkenyl succinic acid ester. Alternatively, 1 mole of alkenyl succinic anhydride, for example, dodecenyl succinic anhydride, may be refluxed with 1 mole of an alkali metal alcoholate, such as sodium ethylate, in the presence of benzene for 2 to 8 hours. The alkali may be removed by washing the product with mineral acid, and the benzene removed by distillation, leaving the acid ester of the alkenyl succinic anhydride.

The condensation products prepared as above described were tested as adhesivity agents for bitumens in the following manner.

A cut-back asphalt was prepared by mixing 75% of an 85–100 penetration steam reduced petroleum asphalt with 25% of blending naphtha (boiling range 200° F.–350° F.). To samples of this cut-back asphalt were added small amounts (0.1% to 1%) of the various condensation products, and the resulting cut-backs were admixed in small amounts (6%) at 180° F. with mineral aggregate (Rhyolite wetted with 2% of water), the mixing being carried on for 5 minutes. The coated aggregates were allowed to cure by standing in air for 24 hours, and then 50 gram samples of the cured aggregates were placed in 125 ml. Erlenmeyer flasks with 50 ml. of water and observed for percent coating. The flasks were then rotated for 15 minutes at 65 R. P. M. at 80° F. and the percent coating again noted. The results are presented in the following table.

| Condensation Product | Mole Ratio | Per cent Product added to cut-back | Grams cut-back per 100 grams Rhyolite | Per cent Coated Before water test | Per cent Coated After water test |
|---|---|---|---|---|---|
| Nonenyl succinic anhydride-ethylene diamine | 1:2 | 0.12 | 6.0 | 90 | 90 |
|  |  | 1.00 | 6.0 | 100 | 95 |
| Dodecenyl succinic anhydride-ethylene diamine | 1:2 | 0.10 | 6.0 | 85 | 70 |
|  |  | 0.50 | 6.0 | 90 | 90 |
|  |  | 1.00 | 6.0 | 100 | 100 |
| Octadecenyl succinic anhydride-ethylene diamine | 1:2 | 0.10 | 6.0 | 75 | 60 |
|  |  | 0.50 | 6.0 | 80 | 80 |
|  |  | 1.00 | 6.0 | 90 | 90 |
| Nonenyl succinamic acid-ethylene diamine | 1:1 | 1.00 | 7.0 | 90 | 90 |
| Dodecenyl succinamic acid-ethylene diamine | 1:1 | 0.10 | 6.0 | 75 | 60 |
|  |  | 0.50 | 6.0 | 90 | 90 |
|  |  | 1.00 | 6.0 | 100 | 90 |
| Octadecenyl succinamic acid-ethylene diamine | 1:1 | 0.10 | 6.0 | 75 | 60 |
|  |  | 0.50 | 6.0 | 90 | 90 |
|  |  | 1.00 | 6.0 | 90 | 90 |
| Ethyl hydrogen dodecenyl succinate-ethylene diamine | 1:1 | 0.10 | 6.0 | 80 | 40 |
|  |  | 0.50 | 6.0 | 95 | 95 |
|  |  | 1.00 | 6.0 | 100 | 100 |
| None | | | 6.0 | 80 | 30 |

From the data above given, it will be evident that the addition of small amounts of condensation products of diamines with substituted succinic and succinamic acids, and acid esters thereof, markedly enhance the adhesivity of bitumens for mineral aggregates, as compared with bitumins containing no additive.

We claim:

1. A mineral aggregate bonding composition comprising a bitumen and a condensation product of a diamine with a compound from the group consisting of alkyl and alkenyl substituted succinic and succinamic acids, anhydrides, and acid esters thereof, such condensation product being present in an amount sufficient to substantially increase the adhesivity of the bitumen for mineral aggregates.

2. A mineral aggregate bonding composition comprising asphalt and a condensation product of a diamine with a compound from the group consisting of alkyl and alkenyl substituted succinic and succinamic acids, anhydrides, and acid esters thereof, such condensation product being present in an amount sufficient to substantially increase the adhesivity of the asphalt for mineral aggregates.

3. A mineral aggregate bonding composition comprising a cut-back asphalt and a condensation product of a diamine with a compound from the group consisting of alkyl and alkenyl substituted succinic and succinamic acids, anhydrides, and acid esters thereof, such condensation product being present in an amount sufficient to substantially increase the adhesivity of the cut-back asphalt for mineral aggregates.

4. A mineral aggregate bonding composition comprising a bitumen and from 0.1% to 2% of a condensation product of a diamine with a compound from the group consisting of alkyl and alkenyl substituted succinic and succinamic acids, anhydrides, and acid esters thereof.

5. A mineral aggregate bonding composition comprising a bitumen and from 0.1% to 2% of a condensation product of a diamine containing from 2 to 18 carbon atoms with a compound from the group consisting of alkyl and alkenyl substituted succinic and succinamic acids, anhydrides, and acid esters thereof.

6. A mineral aggregate bonding composition comprising a bitumen and from 0.1% to 2% of a condensation product of a diamine containing from 2 to 18 carbon atoms with a compound from the group consisting of alkyl and alkenyl substituted succinic and succinamic acids, anhydrides, and acid esters thereof, said alkyl and alkenyl substituents containing from 5 to 20 carbon atoms.

7. A mineral aggregate bonding composition comprising a bitumen and from 0.5% to 2% of a condensation product of ethylene diamine and nonenyl succinic acid anhydride.

8. A mineral aggregate bonding composition comprising a bitumen and from 0.5% to 2% of a condensation product of ethylene diamine and nonenyl succinamic acid.

9. A mineral aggregate bonding composition comprising a bitumen and from 0.5% to 2% of a condensation product of ethylene diamine and ethyl hydrogen dodecenyl succinate.

ARTHUR B. HERSBERGER.
FRANK J. GOZLOW.

REFERENCES CITED

The following references are of record in the file of this patent:

UNITED STATES PATENTS

| Number | Name | Date |
|---|---|---|
| 2,182,178 | Pinkernelle | Dec. 5, 1939 |
| 2,191,295 | Dohse et al. | Feb. 20, 1940 |
| 2,378,235 | Miles | June 12, 1945 |
| 2,386,867 | Johnson | Oct. 16, 1945 |
| 2,427,488 | Anderson et al. | Sept. 16, 1947 |

FOREIGN PATENTS

| Number | Country | Date |
|---|---|---|
| 847,829 | France | July 10, 1939 |
| 568,385 | Great Britain | Apr. 3, 1945 |